June 16, 1959 R. TOWNSEND 2,890,831
SERIAL ADDER WITH RADIX CORRECTION
Filed Nov. 19, 1953
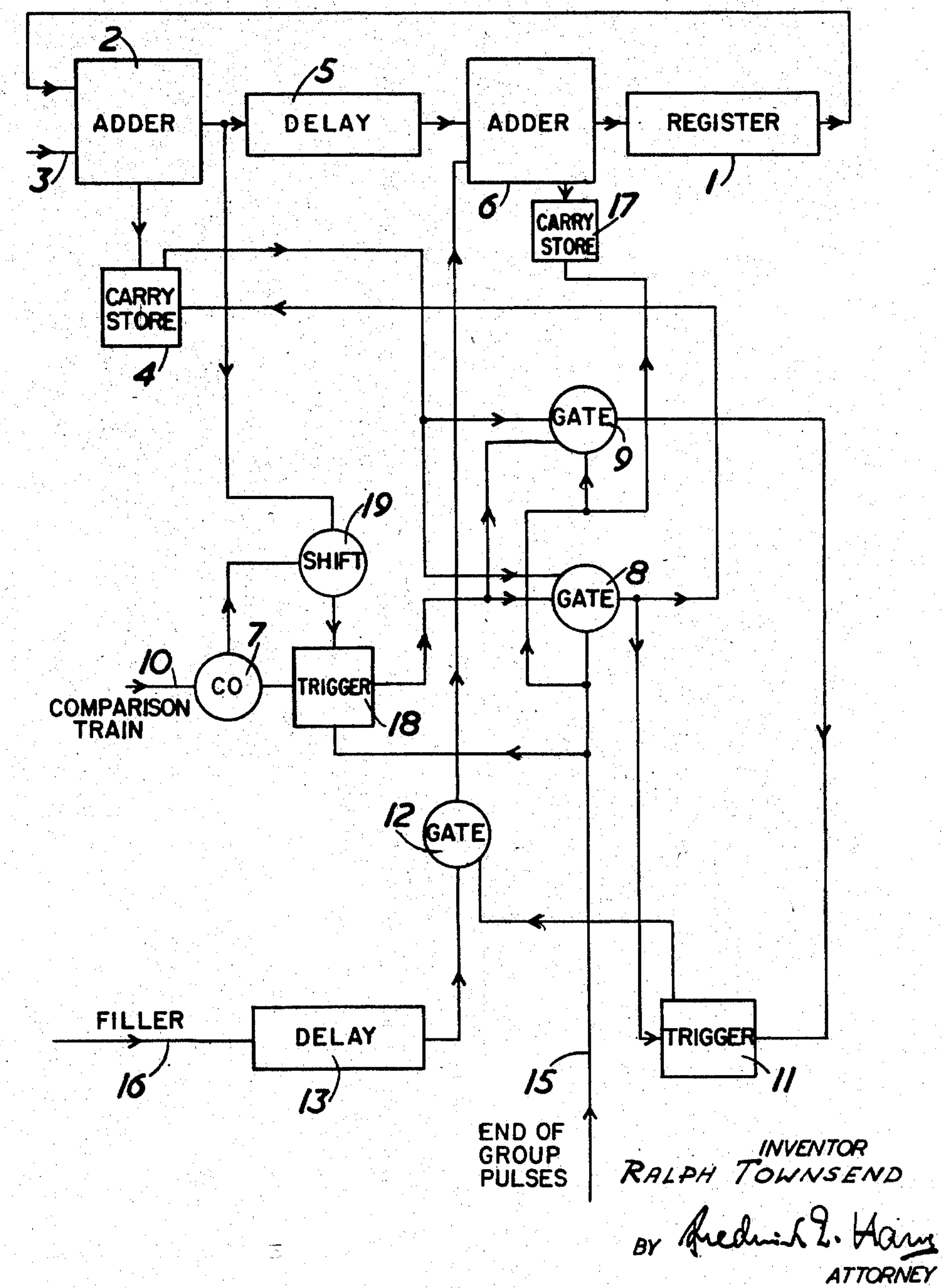
INVENTOR
RALPH TOWNSEND
BY Frederick E. Harris
ATTORNEY United States Patent Office 2,890,831

Patented June 16, 1959

2,890,831

SERIAL ADDER WITH RADIX CORRECTION

Ralph Townsend, Letchworth, England, assignor to The British Tabulating Machine Company Limited, London, England Application November 19, 1953, Serial No. 393,142

Claims priority, application Great Britain February 6, 1953

9 Claims. (Cl. 235—170)

This invention relates to electronic apparatus for adding together two numbers represented by serial trains of binary coded pulses.

It has already been proposed, in British patent specification No. 678,427, to add two serial trains of binary coded pulses by using a binary adder and then correcting the resultant sum pulse train by the addition of "filler" digit pulse groups. The circuits for determining which pulse groups require correction are rather complex and are equivalent to a binary adder.

The object of the present invention is to provide an improved circuit for determining which pulse groups require correction in an uncorrected serial train of binary coded pulse groups.

According to the invention electronic apparatus for adding together two serial trains of binary coded pulse groups has a first adding means for producing an uncorrected sum pulse train, a carry storage device for the first adding means, comparing means for determining whether each sum pulse group is equal to or greater than the radix of notation of the group, means controlled jointly by the comparing means and by the carry storage device for generating "filler" digit pulse groups, a second adding means for adding the "filler" digit pulse groups to the uncorrected sum pulse train to produce a corrected sum pulse train and means for setting the carry storage device each time a "filler" digit pulse group is generated.

The invention will now be described by way of example, with reference to the accompanying drawing which is a block diagram of a coded pulse group adder.

One of the numbers to be added is held in a storage device 1, which is preferably of the shifting register type. The number is fed from the output of the storage device 1, as a serial pulse train, to one input of a binary adder 2. The second number is fed to the other input of the adder 2 on a line 3. It will be assumed that both the numbers are in binary coded decimal form, that is, each decimal denomination is represented by a group of four pulse positions corresponding to the values 1, 2, 4 and 8, as described in British patent specification No. 678,427.

As in the adding circuits of the above-mentioned patent, the uncorrected sum pulse train which appears at the output of the binary adder 2 is fed through a delay device 5, providing a delay equal to one pulse group, to one input of a second binary adder 6. "Filler" digit pulse groups are fed selectively to the other input of the adder 6, so that the output of this adder comprises the corrected sum pulse train.

Since the numbers are in decimal and each denomination is represented by a four pulse group, a "filler" digit pulse group represents the value six. The adder 6 must receive a "filler" digit pulse group whenever an uncorrected sum pulse group which is passing through the adder represents ten or more. If the uncorrected pulse group is less than ten, then zero is added to it.

The selective addition of the "filler" digit pulse group is controlled jointly by the state of a carry storage trigger 4 at the end of each group, and by the result of a comparison between each uncorrected sum pulse group and a pulse group representing the radix of notation less one, which is nine in the case of decimal numbers. This double control of the addition is necessary because there are three conditions which may arise:

(1) The sum of two digits is less than ten, then the uncorrected sum is nine or less and there is no carry;

(2) The sum of two digits is greater than nine and less than sixteen, then the uncorrected sum is greater than nine and there is no carry;

(3) The sum of two digits is greater than fifteen, then the uncorrected sum is less than nine and there is a carry.

Condition (1) requires the addition of zero in the adder 6 and conditions (2) and (3) require the addition of a "filler" digit pulse group.

A comparison pulse train, representing the radix of notation, less one, in each group, is fed by a line 10 to a coincidence circuit 7. The coincidence circuit is also controlled by a comparison trigger 18. If the values represented by the comparison pulse train and the setting of the trigger 18 at any time are both zero, or both one, then the coincidence circuit operates a shifting circuit 19 to set the trigger 18 to correspond with the sum digit produced by the adder 2. The trigger circuit 18 is set to zero before each pulse group by pulses on a line 15. Under these conditions, the trigger 18 will be set to represent one at the end of a sum pulse group if the group is greater than nine and will be set to zero if the group is equal to or less than nine. The operation and detailed circuits of this comparison device are described in United States application Serial No. 375,226 filed August 19, 1953, now Patent No. 2,776,418.

A gate 8 is controlled jointly by the trigger 18 and by the carry storage trigger 4. If either of these triggers is set to one, the gate 8 is open and allows a pulse on the line 15, occurring at the end of the group, to pass and switch on a trigger 11. The switching on of this trigger opens a gate 12 which also has a pulse train, representing the "filler" digit in each group, applied to it from a line 16, via a delay device 13, which gives a delay equal to one pulse group. The output of the gate 12 is fed to one input of the adder 6.

In this way, if either the carry storage trigger or the trigger 18 is set to one at the end of a pulse group, indicating that the sum of the two digits which have been added is ten or more, the gate 12 is opened to feed a "filler" digit pulse group to the adder 6. Since the uncorrected sum pulse group is delayed by the delay device 5, it arrives at the adder 6 in synchronism with the "filler" digit pulse group.

The triggers 4 and 18 also control a gate 9. This gate is open when both the triggers are set at zero, indicating that the sum of the two added digits is less than ten. At the end of the group, a pulse on the line 15 passes through the gate 9 and is applied to the trigger 11 to switch it off, thus closing the gate 12.

The addition of the "filler" digit pulse group to a sum pulse group representing a value greater than nine will produce a carry at the end of the group which will be registered on a carry storage trigger 17 of the adder 6. This carry would normally be added in during the passage of the succeeding group through the adder 6. This is effective as long as this succeeding group does not have a value of nine. In this case, the addition of the carry produces a pulse group in the corrected output from the adder 6 which has a value of ten.

To avoid this difficulty, the carry storage trigger 17 is reset to zero at the end of each group by a pulse on the line 15, thus suppressing all carries between pulse groups in the adder 6. Instead, the carry storage trigger 4 is caused to add in these carries by utilising the output pulses from the gate 8 to set the trigger to one. Thus the trigger 4 is set every time the gate 12 is opened to allow a "filler" digit pulse to pass to the adder 6. The gate 12 may have been opened because the trigger 4 was set to one at the end of the group, in which case the pulse from the gate 8 has no effect on this trigger.

Since the adders 2 and 6 have to perform only binary addition, any convenient type may be employed, but it is preferred to use an adder similar to that described in United States application Serial No. 344,713 filed March 26, 1953. This patent application also describes a shifting register, and gating and shifting circuits which are suitable for use in the present binary coded adder.

It will be appreciated that by providing suitable pulse trains on the lines 10 and 16, the binary coded adder may be utilised for non-decimal and mixed notations, in the same way as the circuits described in British patent specification No. 678,427.

What we claim is:

1. Electronic apparatus for adding together two number-representing serial trains of binary pulse groups, each group representing a single denomination of a notation having a radix greater than two, which apparatus comprises first binary adding means having a sum output, a carry storage device for said adding means, means for applying said number-representing pulse trains to said first adding means, pulse by pulse comparing means operatively connected to said sum output, means for applying to said comparing means a train of comparison pulse groups, each said comparison group representing said radix less one, said comparing means being rendered effective when any group of the sum train from said adding means represents a value exceeding the value of a comparison group, second binary adding means, means for applying the said sum output to said second binary adding means, control means jointly controlled by said carry storage device and said comparing means for applying to said second adding means a filler digit pulse group when said carry storage device registers an end of group carry and when said sum train represents a value not less than said radix, and means controlled by said control means for setting said carry storage device each time said filler digit pulse group is applied.

2. Electronic apparatus for adding together two number-representing serial trains of binary pulse groups, each group representing a single denomination of a notation having a radix greater than two, which apparatus comprises first binary adding means having a sum output, a carry storage device for said adding means, pulse by pulse comparing means operatively connected to said sum output, means for applying to said comparing means a comparison train of pulse groups such group representing said radix less one said comparing means comparing pulse by pulse said sum train with said comparison train and being effective when any group of said sum train represents a value exceeding the value of a group of said comparison train, gating means controlled jointly by said carry storage device and said comparing means, means for applying to said gating means a filler serial pulse group train, each group representing a filler digit, second binary adding means, means for applying said sum output to said second binary adding means, means for applying the output from said gating means to said second adding means, and means controlled by said carry storage device and said comparing means for setting said carry storage device each time said filler digit pulse group is applied to said second adding means.

3. Electronic apparatus for adding together two number-representing serial trains of binary pulse groups, each group representing a single denomination of a notation having a radix greater than two, which apparatus comprises first binary adding means having a sum output, means for applying to said adding means said number-representing pulse trains, a carry storage device for said adding means, pulse-by-pulse comparing means operatively connected to said sum output, means for applying to said comparing means a comparison train of pulse groups, each group representing said radix less one for pulse-by-pulse comparison with the sum pulse output from said first adding means, said comparing means being effective when any sum pulse group is greater than a comparison pulse group, second binary adding means, means for applying said sum output to said second binary adding means, gating means the output of which is operatively connected to said second binary adding means, means for applying to said gating means a filler digit pulse group train, each group of which represents the sum of one and the difference between the largest value representable by a pulse group and said radix, means controlled by said carry storage device and said comparing means for rendering said gating means effective when an end of group carry is registered in said carry storage device and when said comparing means are effective, and means controlled by said carry storage device and said comparing means for setting said carry storage device each time said filler digit pulse group is applied to said second adding means.

4. Apparatus as claimed in claim 3 in which said second adding means comprise a carry storage device and means are provided for resetting said second carry storage device to zero at the end of each pulse group.

5. Electronic apparatus for adding together two number-representing serial trains of binary pulse groups, each group representing a single denomination of a notation having a radix greater than two, which apparatus comprises first binary adding means having a sum output, means for applying to said adding means said number-representing pulse trains, a carry storage device for said adding means, pulse-by-pulse comparing means operatively connected to said sum output, means for applying to said comparing means a comparison train of pulse groups, each group representing said radix less one for pulse-by-pulse comparison with the sum pulse output from said first adding means, said comparing means being effective when any sum pulse group is greater than a comparison pulse group, second binary adding means, means for applying said sum output to said second binary adding means, first gating means controlled jointly by said comparing means and said carry storage device, means for applying an end of group pulse to said first gating means, a trigger operatively connected to the output from said first gating means, second gating means controlled by said trigger, means for applying to said second gating means a filler digit pulse group train, each group of which represents the sum of one and the difference between the largest value representable by a pulse group and said radix, means for applying to said second adding means the output from said second gating means, and means connected to the output of said first gating means for applying a setting pulse to said carry storage device.

6. Electronic apparatus for adding together two number-representing serial trains of binary pulse groups, each group representing a single denomination of a notation having a radix greater than two, which apparatus comprises first binary adding means having a sum output, means for applying to said adding means said number representing pulse trains, a first carry storage device for said adding means, pulse-by-pulse comparing means operatively connected to said sum output, means for applying to said comparing means a comparison train of pulse groups each group representing said radix less one, for pulse-by-pulse comparison with the sum pulse output from said first adding means, second binary adding means, means for applying said sum output to said second binary adding means, a second carry storage device for said second adding means, first gating means controlled jointly by said comparing means and said first carry storage device, means for applying an end of group pulse to said first gating means, a trigger operatively connected to the output from said first gating means, second gating means controlled by said trigger, means for applying to said second gating means a filler digit pulse group train each group of which represents the sum of one and the diffrence between the largest value representable by a pulse group and said radix, means for applying to said second adding means the output from said second gating means, means connected to the output of said first gating means for applying said pulse to said first carry storage device, and means for resetting said second carry storage device to zero at the end of each pulse group.

7. Electronic apparatus for adding together two number-representing serial trains of binary pulse groups, each group representing a single denomination of a notation having a radix greater than two, which apparatus comprises first binary adding means having a sum output, means for applying to said adding means said number-representing pulse trains, a carry storage device for said adding means, pulse-by-pulse comparing means operatively connected to said sum output, means for applying to said comparing means a comparison train of pulse groups each group representing said radix less one, for pulse by pulse comparison with the sum pulse output from said first adding means, second binary adding means, means for applying said sum output to said second binary adding means, first gating means controlled jointly by said comparing means and said carry storage device, means for applying an end of group pulse to said first gating means, a trigger operatively connected to the output from said first gating means, said trigger being set to a first state on the occurrence of a pulse output from said first gating means, second gating means controlled jointly by said carry storage device and said comparison circuit, means for applying an end of group pulse to said second gating means, the output of said second gating means being operatively connected to said trigger whereby said trigger is set to a second state on the occurrence of a pulse output from said second gating means, third gating means controlled by said trigger, means for applying to said third gating means a filler digit pulse group train, each group of which represents the sum of one and the difference between the largest value representable by a pulse group and said radix, means for applying to said second adding means the output from said third gating means, and means connected to the output of said first gating means for applying a setting pulse to said carry storage device.

8. Electronic apparatus for adding together two number-representing serial trains of binary pulse groups, each group representing a single denomination of a notation having a radix greater than two, which apparatus comprises first binary adding means having a sum output, means for applying to said adding means said number representing pulse trains, a carry storage device for said adding means, a comparison trigger, a coincidence circuit, means for applying to said coincidence circuit a comparison train of pulse groups, each group representing said radix less one, said coincidence circuit being controlled jointly by said comparison trigger and said comparison pulse train, means controlled by said coincidence circuit for setting the comparison trigger in accordance with the sum pulse from said first adding means, second binary adding means, means for applying said sum output to said second binary adding means, first gating means controlled jointly by said comparison trigger and said carry storage device, means for applying an end of group pulse to said first gating means, a second trigger operatively connected to the output from said first gating means, second gating means controlled by said comparison trigger and said carry storage device, means for applying an end of group pulse to said second gating means, the output from said second gating means being connected to said second trigger, said second trigger being reset by the output from said second gating means, third gating means controlled by said second trigger, means for applying to said third gating means a filler digit pulse group train, each group of which represents the sum of one and the difference between the largest value representable by a pulse group and said radix, means for applying to said second adding means the output from said third gating means, and means connected to the output of said first gating means for applying a setting pulse to said carry storage device.

9. Electronic apparatus for adding together two number-representing serial trains of binary pulse groups, each group representing a single denomination of a notation having a radix greater than two, which apparatus comprises first binary adding means having a sum output, means for applying to said adding means said number-representing pulse trains, a carry storage device for said adding means, a comparison trigger, a coincidence circuit, means controlled by said coincidence circuit for setting said trigger by the sum pulses from said first adding means, means for controlling said coincidence circuit jointly by said trigger and by a comparison train of pulse groups each of which represents said radix less one, second binary adding means, means for applying said sum output to said second binary adding means, gating means having an output operatively connected to said second binary adding means, means for applying to said gating means a filler digit pulse group train, each group of which represents the sum of one and the difference between the largest value representable by a pulse group and said radix, means controlled by said carry storage device and said comparison trigger for rendering said gating means effective when an end of group carry is registered in said carry storage device and when said comparison trigger is set, and means controlled by said carry storage device and said comparison trigger for setting said carry storage device each time said filler digit pulse group is applied to said second adding means.

References Cited in the file of this patent

FOREIGN PATENTS

| | | |
|---|---|---|
| 514,392 | Belgium | Oct. 15, 1952 |
| 678,427 | Great Britain | Sept. 3, 1952 |
| 1,035,453 | France | Apr. 15, 1953 |

OTHER REFERENCES

Progress Report (2) on the EDVAC, declassified Feb. 13, 1947, Moore School, Univ. Pa. (Fig. P-Y-O-108, pages 1-1-27 to 1-1-29).